United States Patent [19]

Ericsson

[11] Patent Number: 4,475,854

[45] Date of Patent: Oct. 9, 1984

[54] LASHING DEVICE

[75] Inventor: Sven-Olow Ericsson, Onsala, Sweden

[73] Assignee: Cargo Safe Soe AB, Sweden

[21] Appl. No.: 396,170

[22] Filed: Jul. 8, 1982

[30] Foreign Application Priority Data

Mar. 31, 1982 [SE] Sweden .............................. 8202047

[51] Int. Cl.³ .............................................. B60P 7/13
[52] U.S. Cl. .................................. 410/103; 74/577 S;
188/82.7; 248/499; 254/376; 254/223
[58] Field of Search .................... 410/96, 97, 100, 101,
410/103; 74/577 S, 577 R, 577 M, 575;
188/82.7, 82.4; 248/499, 500; 254/375, 376,
356, 357, 310, 321, 264, 266, 306–308, DIG. 12,
223

[56] References Cited

U.S. PATENT DOCUMENTS 1,163,169 12/1915 Pavelka .......................... 254/375 X
3,223,386 12/1965 Frisbie et al. .................... 254/310 X
3,939,729 2/1976 Brockelsby ..................... 188/82.7 X Primary Examiner—Randolph Reese
Assistant Examiner—Glenn Foster
Attorney, Agent, or Firm—Harness, Dickey & Pierce

[57] ABSTRACT

A lashing device for securing objects on ship's decks. The lashing device comprises a U-shaped frame member having two legs and an attachment part. Between the frame member legs extend a strap winding-on drum and a spring-biased shaft, and a holding pawl member is attached on the shaft portion that projects laterally beyond one of the frame member legs. The pawl member engages with a cogged ratchet wheel on the winding-on drum and prevents the strap from being unwound from the latter.

The shaft is movable in a direction coinciding with the rotational direction of the winding-on drum. Owing to this arrangement the holding pawl member is pressed out of its engaged holding position upon actuation of said shaft, preferably effected by impact thereon by means of a ratchet wrench, and when the holding pawl is thus in its disengaged position the strap may be unwound from the drum through the action of the tension in said strap.

7 Claims, 4 Drawing Figures

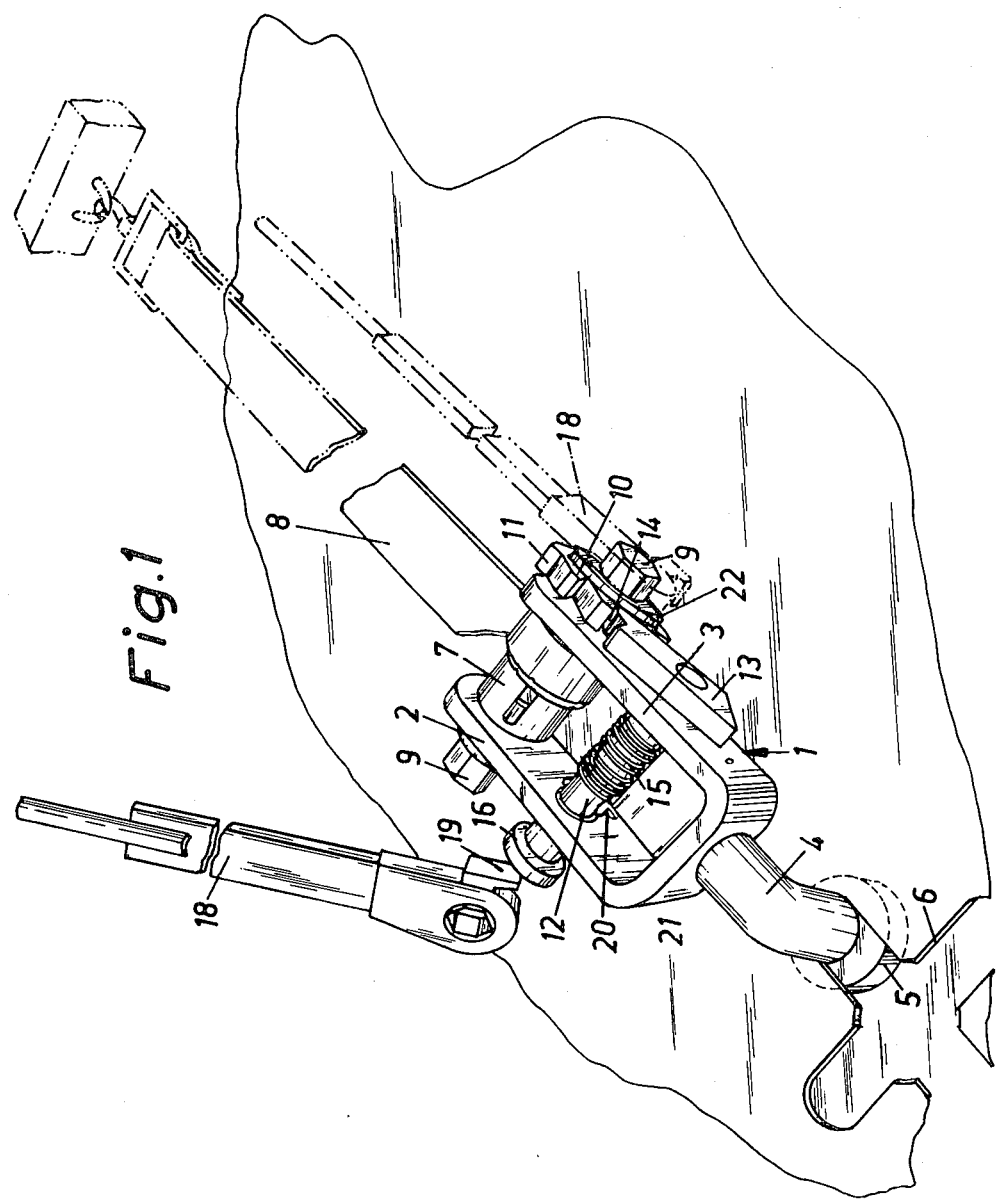

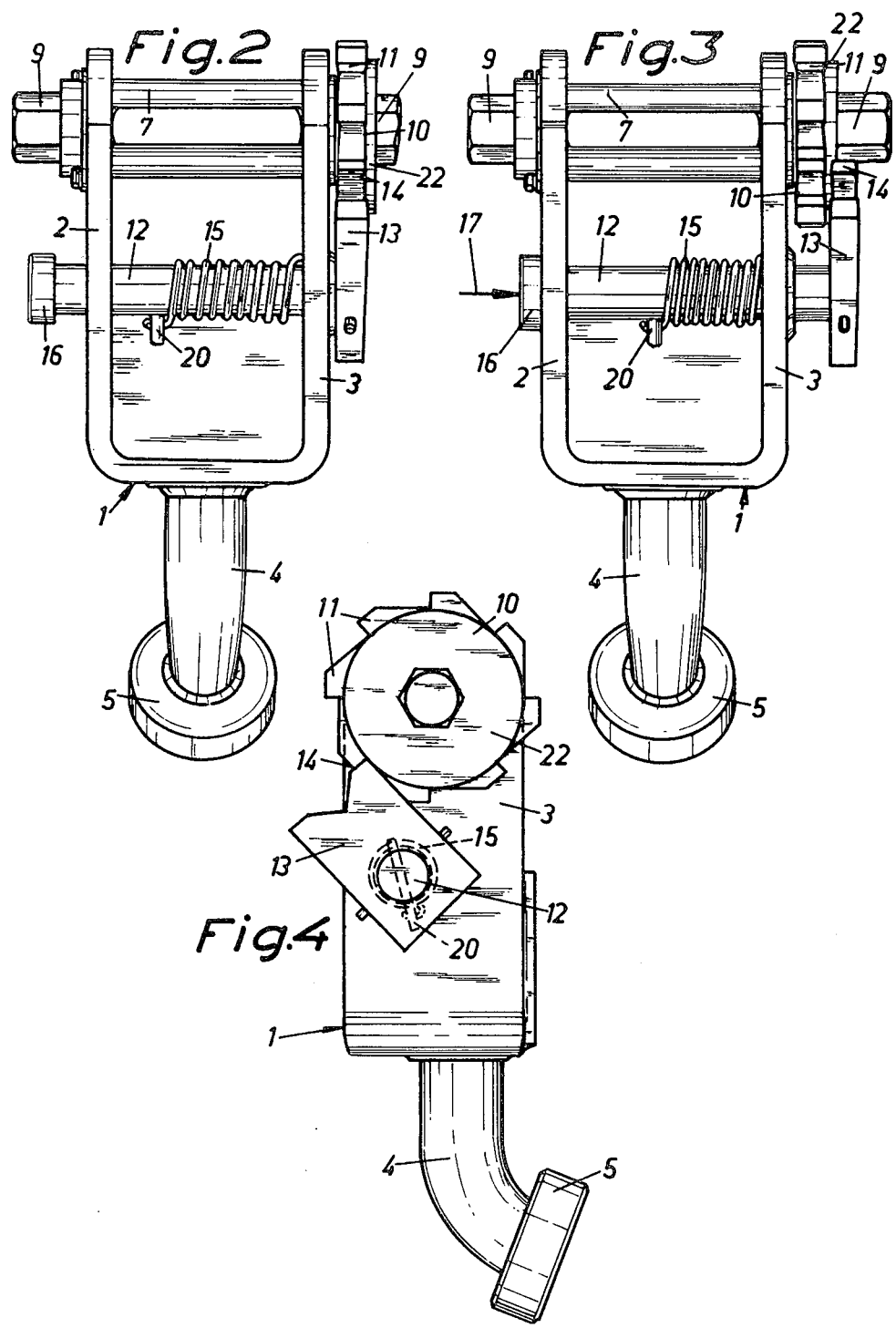

LASHING DEVICE

BACKGROUND OF THE INVENTION

The subject invention concerns a lashing or tying-down device to secure objects on ship's decks, the device comprising a U-shaped frame member having two legs between which extends a sling winding-on means, and further comprising a spring-biased holding pawl member which is normally urged by the spring into a position wherein it secures a sling or strap wound onto the winding-on means. The objects or cargo to be secured by the device in accordance with the invention preferably consist of cars or vehicles of various kinds. The lashing or securing device is intended to be used together with conventional slings or cargo hold-down straps of the kind which are attached to the vehicles by means of hooks or similar members.

One tying-down or lashing device designed for use on ship's decks and similar loading platforms is described in Swedish patent application No. 5629/71. This patent application describes a lashing device comprising a U-shaped member between the legs of which is mounted a strap reel-on drum. The drum supports a ratchet wheel on its parts projecting laterally beyond the U-member legs. A pawl member is provided to prevent ratchet wheel rotation in a direction causing unwinding of the strap. The pawl member is spring-biased to assume its ratchet-wheel holding position but may be manually operated from this position to release the strap, allowing it to be paid out and slackened.

It is desireable that loading and unloading of cargo, such as cars onto and from ship's decks be performed quickly and in the easiest possible manner, that is, without heavy manual operations. Also, it is necessary to minimize all risks of hazard as well as injuries to the workmen performing the loading and unloading, such as crushing injuries. Since the tension in the cargo hold-down strap by necessity is quite considerable the risks of injuries when the strap is slackened is evident when a device of the prior-art kind outlined above is used.

SUMMARY OF THE INVENTION

The purpose of the subject invention is to provide a lashing or tying-down device designed to allow a tensioned sling to be released and slackened in the quickest possible manner while at the same time minimizing the risk of injuries to the handling personnel. This is achieved in accordance with the invention without impairing the possibility of tensioning the sling.

More precisely, the purposes indicated above are achieved in the lashing device in accordance with the invention in that the spring-biased holding pawl member is movable in a direction essentially coinciding with the rotational axis of the winding-on means and in that the holding pawl, upon its movement in that direction, is arranged to release the winding-on means so as to slacken the sling by utilizing the sling tension.

Further advantages and characteristics of the invention will appear from the appended claims.

BRIEF DESCRIPTION OF THE DRAWINGS

The invention will be described in closer detail in the following with reference to the accompanying drawings, wherein FIG. 1 is a perspective view of a lashing device in accordance with the invention, the device being shown securely mounted on a ship's deck with the sling tying down cargo thereon, FIG. 2 is a plan view of the lashing device in accordance with the invention, the pawl member assuming its ratchet wheel engagement position or holding position, FIG. 3 is a view corresponding to that of FIG. 2 but showing the pawl member in its non-engaged release position, and finally, FIG. 4 is a lateral view, as seen from the right in FIGS. 2 and 3, of the lashing device in accordance with the invention.

DETAILED DESCRIPTION OF A PREFERRED EMBODIMENT

The lashing or tying-down device 1 in accordance with the invention is designed as a U-shaped frame having two legs 2, 3 projecting from an attachment part 4 provided with a foot 5. The foot is designed to be fitted into and secured in cross-shaped slots 6 made in the ship's deck.

Between the legs 2, 3 of the U-frame, adjacent the outer free ends thereof, is mounted a winding-on means in the form of a winding-on drum 7 onto which a cargo hold-down strap or sling 8 is wound in order to be tensioned. The winding-on drum 7 is operated by means of bolts 9 projecting laterally beyond each leg. A ratchet wheel 10 with cogs 11 thereon is mounted externally of one 3 of the legs in a position between the outer face of the leg and the associated bolt 9. The ratchet wheel is preferably welded to the drum 7. The cogs 11 of the ratchet wheel 10 are shaped with one straight edge and with an opposite oblique edge.

A shaft 12 extends between the legs 2, 3 along an axis parallel with the winding-on drum 7 but spaced therefrom in a direction further towards the attachment part 4. The end of the shaft 12 projecting beyond the leg 3 supports a holding pawl member 13. The latter engages between the cogs 11 by means of an abutment edge 14 against which edge the straight edges of the cogs 11 abut when the winding-on drum is urged to rotate counter-clockwise. A spring 15 applies a clock-wise directional moment on the shaft 12, thus urging the holding pawl member 13 towards the engaged, holding position of the latter. The shaft 12 supports a head 16 at the opposite end projecting beyond the leg 2. The shaft 12 is mounted in the legs 2, 3 in such a manner as to allow displacement of the shaft in the transverse direction of the legs, that is, in the direction of the rotational axis of the winding-on drum 7. The distance between the head 16 and the holding pawl 13 is approximately equal to the distance between the external faces of the legs 2 and 3 plus the thickness of the ratchet wheel 10. The spring 15 biases the shaft 12 so as to urge it to the left as seen in FIGS. 2 and 3, towards the position illustrated in FIG. 2. When a pressure is applied on the head 16 in the direction indicated by arrow 17 in FIG. 3 the holding pawl member 13 is moved out of its engagement with the ratchet wheel 10, see FIG. 3, and it is possible to unwind the strap from the winding-on drum 7. Since the strap is under considerable tension, it will cause the drum 7 to rotate at a high speed during the un-winding and the holding pawl member consequently will remain in its non-engaged, non-holding position until the tension diminishes and the winding-off speed is reduced.

FIG. 1 illustrates one convenient manner of releasing the winding-on drum 7 from the locked position in which it is held by the engagement of the pawl member with the ratchet wheel. A ratchet wrench 18 is hit against the head 16. The impact therefrom presses the shaft 12 to the position illustrated in FIG. 3. The tension of the strap causes the latter to be reeled off the winding-on drum 7 and the strapped object may be released by hooking off the strap 8 which is no longer under tension. The ratchet wrench 18 is shown also in FIG. 1 in dash-and-dot lines in a position in which it serves to tension the strap 8 by winding it onto the winding-on drum 7. The ratchet wrench 18 is of a kind known per se and it functions by advancing the ratchet wheel when turned in one direction but blocking it against advancement in the opposite direction. The holding pawl member 13 on the lashing device assists in this tensioning operation by preventing the winding-on drum from being turned in any other direction than clockwise as seen in FIG. 4. The ratchet wrench 18 is formed with an abutment shoulder 19 which serves as the surface of impact when hitting the head 16 to prevent the wrench from being damaged in this operation.

One end of the spring 15 is mounted about a pin 20 which is arranged on the shaft 12. The opposite end of the spring 15 is secured in the leg 3. In this manner the spring force is directed to the left as seen in FIGS. 2 and 3 and clockwise as seen in FIG. 4. When the holding pawl member 13 assumes its non-engaged, non-holding position it rests against a sliding face formed on a bevelled portion 22 formed on the external face of the ratchet wheel 10. FIG. 3 illustrates the position of the holding pawl member 13 when resting against the external face of the bevelled portion 22. This bevelled portion preferably has a diameter corresponding to the inner diameter of the ratchet wheel 10. As a result, the holding pawl member 13 is capable of snapping back un-assisted into the holding position in engagement with the ratchet wheel. Alternatively, a separate ring may be provided adjacent the ratchet wheel 10, in which case this ring is formed with an external edge corresponding to the sliding face formed on the bevelled portion 22.

The embodiment described in the aforegoing is to be regarded as an example only and a number of modifications are possible within the scope of the appended claims. The part of the lashing device intended to be secured in the ship's deck and which is shown in the drawings in the shape of a cross could obviously have a number of other convenient shapes. For instance, it may be in the form of a hook arranged to engage at suitable points, or in the shape of a plate which may be secured by a shackle. Also the attachment part may be designed differently from that shown.

What I claim is:

1. An improved lashing device to secure objects on a base, said device comprising a U-shaped frame member having two legs and means for affixing said frame to the base, a strap winding-on drum journalled in said frame member legs about an axis extending between said legs, a holding pawl member, and spring means normally urging said pawl in a first direction into a position holding a strap wound onto said winding-on drum against loosening, the improvement comprising
said holding pawl member arranged for movement in a direction perpendicular to said first direction to a position lateral of said winding on drum wherein said pawl member is out of engagement with said winding-on drum to release said winding-on drum so as to slacken said strap by utilizing the strap tension.

2. An improved lashing device as claimed in claim 1, wherein said pawl member comprises a shaft extending through said two legs of said U-shaped frame member, a pawl fixed on said shaft, said spring means being operative to bias said shaft, the spring force applied on said shaft acting in the axial direction of said shaft as well as with a moment in such a manner as to urge said holding pawl member towards the holding position thereof, and a head on said shaft, said head arranged to prevent displacement of said shaft out of its engagement in said frame member legs but to allow movement of said shaft to bring said holding pawl member from the holding position thereof.

3. An improved lashing device as claimed in claim 2, wherein the spring means comprises one single spring arranged to apply both spring-bias forces on said holding pawl member in the lengthwise and rotary direction of said shaft.

4. An improved lashing device as claimed in claim 2, comprising a ratchet wrench to tighten said winding-on drum, said ratchet wrench arranged to be hit against said head on said shaft to bring said holding pawl member out of the holding position thereof.

5. An improved lashing device as claimed in claim 1, comprising a ratchet wheel having cogs thereon, said ratchet wheel connected with said winding-on drum, said holding pawl member engaging with said ratchet wheel cogs in its holding position, and a sliding face provided laterally of said cogs of said ratchet wheel, said holding pawl member arranged to abut against said sliding face in its non-holding position.

6. An improved lashing device as claimed in claim 5, wherein said sliding face is a bevelled portion on said ratchet wheel.

7. An improved lashing device as claimed in claim 5, wherein said sliding face is the outer edge of a ring, said ring positioned laterally of said ratchet wheel.

* * * * *